United States Patent
Chung et al.

(10) Patent No.: US 10,592,040 B2
(45) Date of Patent: Mar. 17, 2020

(54) TOUCH PANEL LIQUID CRYSTAL DISPLAY DEVICE AND METHOD OF DRIVING THE SAME

(71) Applicant: LG Display Co., Ltd., Seoul (KR)

(72) Inventors: Jin-Soo Chung, Paju-si (KR); Tae-Kyoung Sung, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/212,131

(22) Filed: Dec. 6, 2018

(65) Prior Publication Data

US 2019/0196643 A1 Jun. 27, 2019

(30) Foreign Application Priority Data

Dec. 22, 2017 (KR) .................. 10-2017-0177727

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13306* (2013.01); *G02F 1/13338* (2013.01);
(Continued)

(58) Field of Classification Search
CPC .. G06F 3/04166; G06F 3/0443; G06F 3/0416; G06F 3/0412; G06F 3/044;
(Continued)

(56) References Cited

U.S. PATENT DOCUMENTS 8,780,074 B2* 7/2014 Castillo ................. G06F 3/044
345/174
2011/0156839 A1* 6/2011 Martin ............... H03K 17/9622
333/172
(Continued)

FOREIGN PATENT DOCUMENTS

| TW | 201604754 A | 2/2016 |
|---|---|---|
| TW | 201709037 A | 3/2017 |
| TW | 201737039 A | 10/2017 |

OTHER PUBLICATIONS

Taiwan Intellectual Property Office, Office Action, TW Patent Application No. 107146410, Oct. 31, 2019, 17 pages.

*Primary Examiner* — Muhammad N Edun
(74) *Attorney, Agent, or Firm* — Fenwick & West LLP

(57) ABSTRACT

Disclosed is a touch panel LCD device for reducing power consumption, frequency noise, or audible noise by applying an LFD signal only to touch electrodes adjacent to touch electrodes for sensing touch and by grounding other touch electrodes and a method of driving the same. The touch panel liquid crystal display device includes touch electrodes arranged on a panel in a matrix form and multiplexers configured to drive the touch electrodes. Each of the multiplexers includes a output channels, a first switching block configured to output a touch sensing signal to a first output channel of the output channels, a second switching block configured to output a load free driving (LFD) signal to second output channels adjacent to the first channel among the output channels, and a third switching block configured to output a ground signal or a floating signal to third output channels among the plurality of output channels.

6 Claims, 16 Drawing Sheets

(51) Int. Cl.
*G02F 1/1343* (2006.01)
*G02F 1/133* (2006.01)
*G06F 3/044* (2006.01)

(52) U.S. Cl.
CPC ........ *G02F 1/134336* (2013.01); *G06F 3/044* (2013.01); *G06F 3/0412* (2013.01); *G06F 3/0443* (2019.05); *G06F 3/04164* (2019.05); *G06F 3/04166* (2019.05)

(58) Field of Classification Search
CPC ............. G06F 3/04164; G02F 1/13338; G02F 1/134336; G02F 1/13306
See application file for complete search history.

(56) References Cited

U.S. PATENT DOCUMENTS

| | | | |
|---|---|---|---|
| 2011/0157068 A1* | 6/2011 | Parker | ................... G06F 1/3203 345/174 |
| 2017/0102825 A1 | 4/2017 | Kim et al. | |
| 2017/0329167 A1 | 11/2017 | Kim et al. | |

* cited by examiner

FIG. 6

TOUCH PANEL LIQUID CRYSTAL DISPLAY DEVICE AND METHOD OF DRIVING THE SAME

CROSS-REFERENCE TO RELATED APPLICATION

This application claims the benefit of Republic of Korea Patent Application No. 10-2017-0177727, filed on Dec. 22, 2017, which is hereby incorporated by reference in its entirety.

BACKGROUND

Field of the Disclosure

The present disclosure relates to a touch panel liquid crystal display (LCD) device and a method of driving the same and, more particularly, to a touch panel liquid crystal display device for reducing power consumption and reducing periodic noise and audible noise, and a method of driving the same.

Discussion of the Related Art

Along with development of multimedia, flat panel display devices have increasingly become important. In accordance with such a trend, flat panel display devices such as a liquid crystal display device, a plasma display device, and an organic light emitting diode display device have been commercialized.

From among the flat panel display devices, a liquid crystal display device has been widely used as a mobile flat panel display device due to advantages of superior picture quality, light weight, thin thickness, and low power consumption and has been particularly applied to a variety of products such as notebooks, computer monitors, and televisions.

A touch panel LCD device has been widely used. The touch panel LCD device includes a touch panel stacked on the LCD device to sense a touch point with which a user's finger or a stylus comes in contact through variation in an electrical characteristic such as resistance or capacitance at the touch point and output information corresponding to the touch point or perform an operation.

An application range of such a touch panel LCD device has been extended to small portable terminals, office devices, mobile phones, etc., as a user interface.

However, a scheme in which the touch panel is additionally stacked on the LCD device is disadvantages in that there is a limit to achieving a thin film due to increase in the thickness of the touch panel LCD device, transmittance efficiency of light is reduced when light passes through the stacked panel, and manufacturing costs increase.

To solve the above problems, an in-cell type touch panel LCD device in which a touch sensor is embedded in a pixel region of an LCD device has been proposed.

FIG. 1 is a schematic cross-sectional view illustrating only a part to which a signal voltage is externally applied in a conventional in-cell type touch panel LCD device.

The conventional in-cell type touch panel LCD device has a structure, as illustrated in FIG. 1, in which gate lines Gate, data lines Source, and common electrodes Vcom are formed on a thin-film transistor (TFT) array substrate 101, and a black matrix 3 for preventing color mixture of subpixels and a color filter layer 104 formed in each pixel region between the black matrixes 103 are formed on the bottom surface of a color filter array substrate 102.

In addition, a Y3 film 108 having a relatively high resistance (a few tens of mΩ to few hundred mΩ) is formed for touch sensing on the top surface of the color filter array substrate 102. An upper polarizing plate 107 and a lower polarizing plate 106 are formed on the top surface of the Y3 film 8 and the bottom surface of the TFT array substrate 101, respectively. The Y3 film 108 is formed in an integrated form with the color filter array substrate 102 on the top surface of the color filter array substrate 102.

Although not illustrated in the figure, a liquid crystal layer is formed between the TFT array substrate 101 and the color filter array substrate 102.

FIG. 2 is a driving waveform chart of the touch panel LCD device of FIG. 1.

As illustrated in FIG. 2, driving of the touch panel LCD device is divided into a display period and a touch sensing period.

During the display period, a scan signal is sequentially applied to the gate lines Gate, a data voltage is applied to the data lines Source, and a common voltage is applied to the common electrodes Vcom, thereby displaying an image. During the touch sensing period, a load free driving (LFD) signal such as a square wave is applied to the gate lines, the data lines, and the common electrodes Vcom, thereby sensing touch.

The Y3 film 108 having a high resistance is grounded (GND) during both the display period and the touch sensing period.

A touch electrode of the touch panel LCD device constructed as described above is configured as illustrated in FIG. 3.

FIG. 3 is a diagram illustrating touch electrode arrangement and driving circuit construction of a conventional touch panel LCD device.

As illustrated in FIG. 3, the touch panel LCD device is a self-capacitive type in-cell touch LCD device including a touch display panel 11 in which a plurality of touch electrodes 13 are arranged in a matrix form. One touch electrode 13 is patterned in units of a plurality of adjacent subpixels. That is, one touch electrode 13 is formed of a transparent conductive material such as indium tin oxide (ITO) and performs a common electrode function during a display period. The plurality of touch electrodes 13 are driven by a plurality of multiplexers MUX 15 mounted in a data driver integrated circuit (IC). Therefore, since the plurality of touch electrodes 13 arranged in the direction of the same horizontal line are driven by one multiplexer 15, the multiplexer 15 and the corresponding plurality of touch electrodes 13 are electrically connected by a touch routing line 14.

Each multiplexer 15, which will be described later with reference to FIGS. 5A-5B, selectively outputs a sensing signal output from a sensing unit 16 to an arbitrary channel and outputs an LFD signal to the other channels.

During a touch sensing period of the conventional touch panel LCD device having the above-described construction, all touch electrodes are not simultaneously sensed. Instead, a touch signal is applied to touch electrodes of one or two vertical lines to sense touch and the LFD signal is applied to touch electrodes of vertical lines adjacent to the electrodes for sensing touch.

FIGS. 4A-4C are a diagram for explaining an example of applying a sensing signal and an LFD signal during a touch sensing period of the conventional touch panel LCD device. FIGS. 5A-5B are a diagram illustrating a detailed construction of a multiplexer illustrated in FIG. 3.

As illustrated in FIGS. 4A-4C, the conventional touch panel LCD device senses touch by applying a touch signal to touch electrodes on one or two vertical lines during a touch sensing period and applies an LFD signal to touch electrodes except for the electrodes for sensing touch. FIGS. 4A-4C show that two configurations as shown in FIG. 3 or 5 are arranged symmetrically.

That is, in order to reduce capacitance between the touch electrodes for sensing touch and the touch electrodes adjacent to the touch electrodes for sensing touch, the LFD signal is applied to the touch electrodes except for the touch electrodes for sensing touch.

Thus, the construction of the multiplexer for applying the sensing signal to the touch electrodes for sensing touch and applying the LFD signal to the touch electrodes except for the touch electrodes for sensing touch is illustrated in FIGS. 5A-5B.

As illustrated in FIG. 3, the plurality of touch electrodes 13 are driven by the plurality of multiplexers 15. Accordingly, each multiplexer 15 includes 9 output channels 1 to 9, a first switching block 10 for outputting a sensing signal from the sensing unit (analog front end (AFE)) 16 to one channel of the 9 output channels 1 to 9, and a second switching block 20 for outputting an LFD signal from an LFD signal output unit LFD to the other output channels except for the channel to which the sensing signal is output.

In FIGS. 5A-5B, each multiplexer 15 includes 9 channels. More specifically, FIG. 5A illustrates that the sensing signal is applied to the first channel 1 and the LFD signal is applied to the other second to ninth channels 2 to 9 and FIG. 5B illustrates that the sensing signal is applied to the ninth channel 9 and the LFD signal is applied to the other first to eighth channels 1 to 8.

As shown in FIG. 4A, the sensing signal is applied to the ninth channels of the left and right screens, and the LFD signal is applied to the other first to eighth channels of the left and right screens.

As shown in FIG. 4B, the sensing signal is applied to the eighth channels of the left and right screens, and the LFD signal is applied to the other first to seventh and ninth channels of the left and right screens.

As shown in FIG. 4C, the sensing signal is applied to the first channels of the left and right screens, and the LFD signal is applied to the other second to ninth channels of the left and right screens.

Herein, the sensing signal and the LED signal have the same waveform.

As described above, in the conventional touch panel LCD device, the sensing signal is applied to touch electrodes for sensing touch and the LFD signal is applied to touch electrodes except for the touch electrodes for sensing touch, during the touch sensing period.

Accordingly, since the LFD signal is applied to the touch electrodes except for the electrodes for sensing touch, power consumed to drive the LFD signal increases.

In addition, since the LFD signal and the sensing signal having the same waveform are applied to all touch electrodes, oscillation is generated by the above signals, thereby increasing audible noise.

If the touch panel LCD device is driven by a long-H scheme in which display and touch are repeated multiple times during one frame of 16.7 ms, periodic noise occurs. That is, when display and touch are repeated 18 or 19 times during one frame of 16.7 ms, periodic noise occurs at 1.2 kHz.

SUMMARY OF THE DISCLOSURE

Accordingly, the present disclosure is directed to a touch panel LCD device and a method of driving the same that substantially obviate one or more problems due to limitations and disadvantages of the related art.

An object of the present disclosure is to provide a touch panel LCD device for applying an LFD signal only to touch electrodes adjacent to touch electrodes for sensing touch and the other touch electrodes are grounded or floated during a touch sensing period to reduce power consumption and frequency noise or audible noise, and a method of driving the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a touch panel liquid crystal display (LCD) device includes a plurality of touch electrodes arranged on a panel in a matrix form, and a plurality of multiplexers configured to drive the plurality of touch electrodes, wherein each of the multiplexers includes a plurality of output channels, a first switching block configured to output a touch sensing signal to a first output channel of the plurality of output channels, a second switching block configured to output a load free driving (LFD) signal to second output channel(s) adjacent to the first output channel among the plurality of output channels, and a third switching block configured to output a ground signal or a floating signal to the other output channels except for the first and second output channels among the plurality of output channels.

In another aspect of the present disclosure, a touch panel liquid crystal display (LCD) device includes a plurality of touch electrodes arranged on a panel in a matrix form, and a plurality of multiplexers configured to drive the plurality of touch electrodes, wherein the plurality of multiplexers include at least one first multiplexer configured to output a touch sensing signal through all output channels thereof, second multiplexers adjacent to the at least one first multiplexer and configured to output a load free driving (LFD) signal through all output channels thereof, and the other multiplexers configured to output a ground signal or a floating signal through all output channels thereof.

In another aspect of the present disclosure, a method of driving a touch panel liquid crystal display (LCD) device including a plurality of touch electrodes arranged on a panel in a matrix form and a plurality of multiplexers configured to drive the plurality of touch electrodes includes applying a touch sensing signal to a plurality of touch electrodes of at least one first vertical line, applying a load free driving (LFD) signal to a plurality of touch electrodes of second vertical lines adjacent to the at least one first vertical line, and grounding or floating the other plurality of touch electrodes.

Each multiplexer may include n channels, output the touch sensing signal to a k-th channel, output an LFD signal to (k−1)-th and (k+1)-th channels, and ground or float the other channels (where n and k are natural numbers and k is less than or equal to n).

In another aspect of the present disclosure, a method of driving a touch panel liquid crystal display (LCD) device including a plurality of touch electrodes arranged on a panel in a matrix form and a plurality of multiplexers configured to drive the plurality of multiplexers includes applying a touch sensing signal to a plurality of touch electrodes of at least one first horizontal line, applying a load free driving (LFD) signal to a plurality of touch electrodes of second horizontal lines adjacent to the at least one first horizontal line, and grounding or floating the other plural touch electrodes.

A k-th multiplexer outputs a touch sensing signal through all channels thereof, (k−1)-th and (k+1)-th multiplexers output an LFD signal through all channels thereof, and the other multiplexers ground or float all channels thereof.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a diagram illustrating touch electrode arrangement and driving circuit construction of a touch panel LCD device according to an embodiment of the present disclosure;

DETAILED DESCRIPTION OF THE DISCLOSURE

Reference will now be made in detail to the exemplary embodiments of the present disclosure, examples of which are illustrated in the accompanying drawings. Wherever possible, the same reference numbers will be used throughout the drawings to refer to the same or like parts.

A touch panel LCD device and a method of driving the same according to the present disclosure will now be described in detail with reference to the attached drawings.

Figure 6:
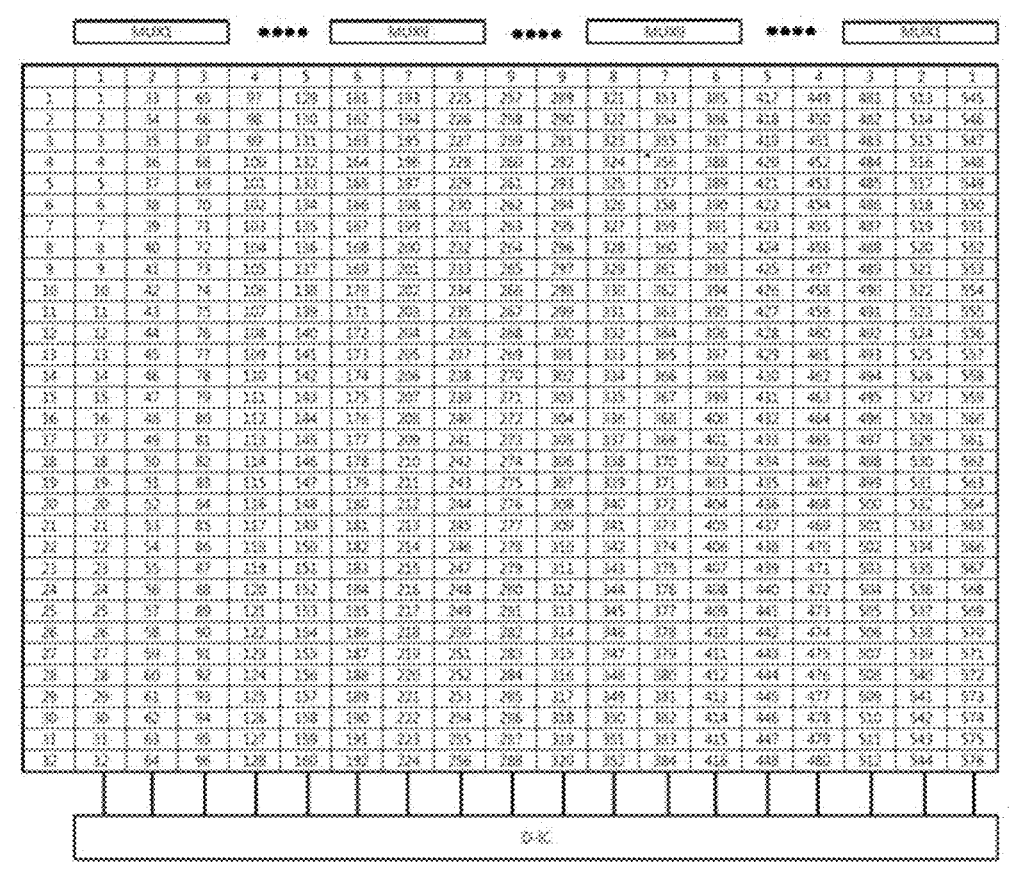
Figure 7A:
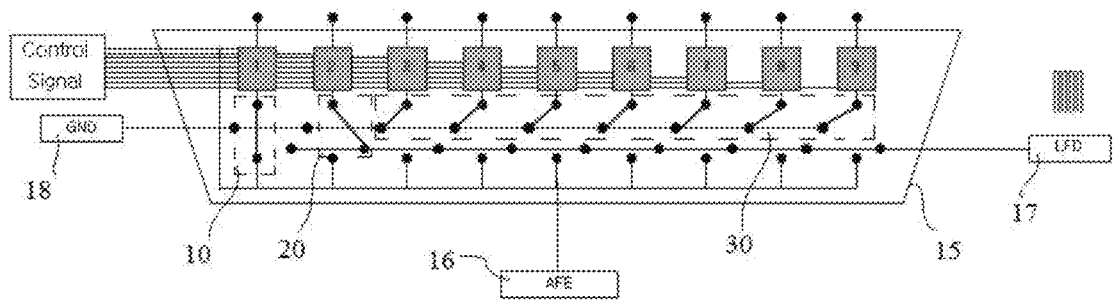
FIGS. 7A and 7B are diagrams illustrating a detailed construction of a multiplexer according to an embodiment of the present disclosure.
Figure 7B:
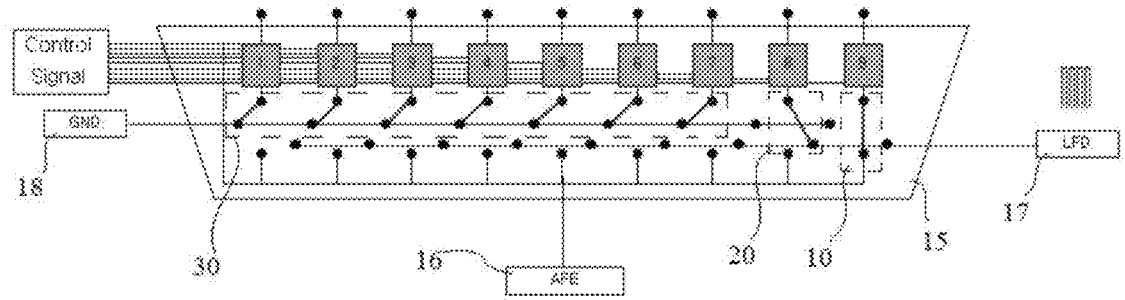

FIG. 6 is a diagram illustrating touch electrode arrangement and driving circuit construction of a touch panel LCD device according an embodiment of the present disclosure, and FIGS. 7A and 7B are diagrams illustrating a detailed construction of a multiplexer according an embodiment of the present disclosure.

The touch panel LCD device according to the present disclosure is a self-capacitive type in-cell touch LCD device including a touch display panel in which a plurality of touch electrodes (e.g., 576 touch electrodes) 1 to 576 are arranged in a matrix form as illustrated in FIG. 6.

The plurality of touch electrodes 1 to 576 are divided based on the center thereof into left touch electrodes which are driven by 32 multiplexers and right touch electrodes which are driven by 32 multiplexers.

That is, the touch electrodes 1 to 288 arranged in the left from the center are driven by a first set of 32 multiplexers and the touch electrodes 289 to 576 arranged in the right from the center are driven by a second set of 32 multiplexers.

Figure 1:
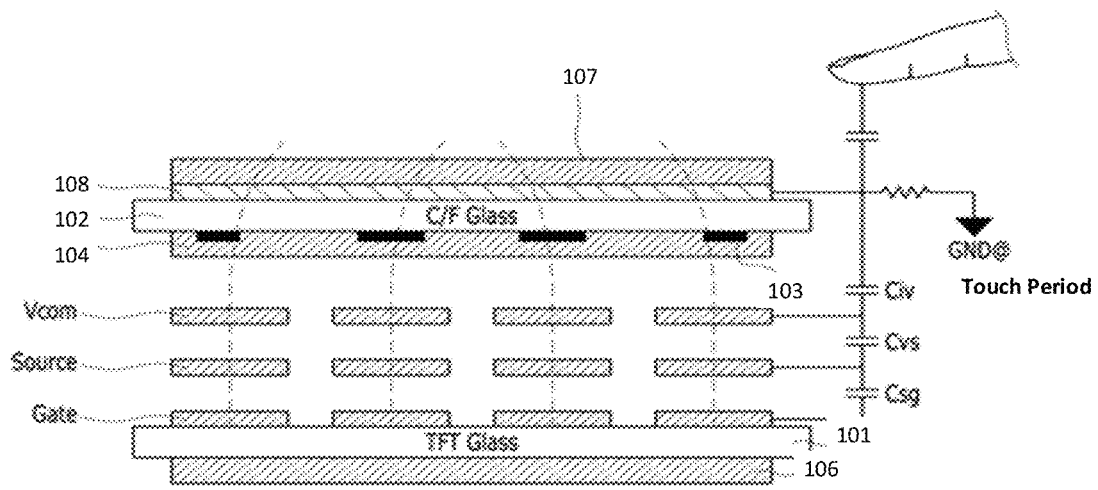
FIG. 1 is a schematic cross-sectional view illustrating only a part to which a signal voltage is externally applied in a conventional in-cell type touch panel LCD device.
Figure 2:
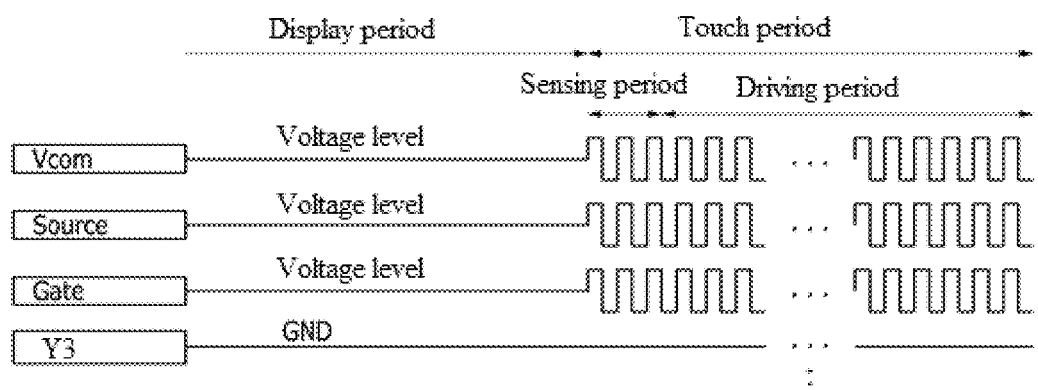
FIG. 2 is a driving waveform chart of the touch panel LCD device of FIG. 1.
Figure 3:
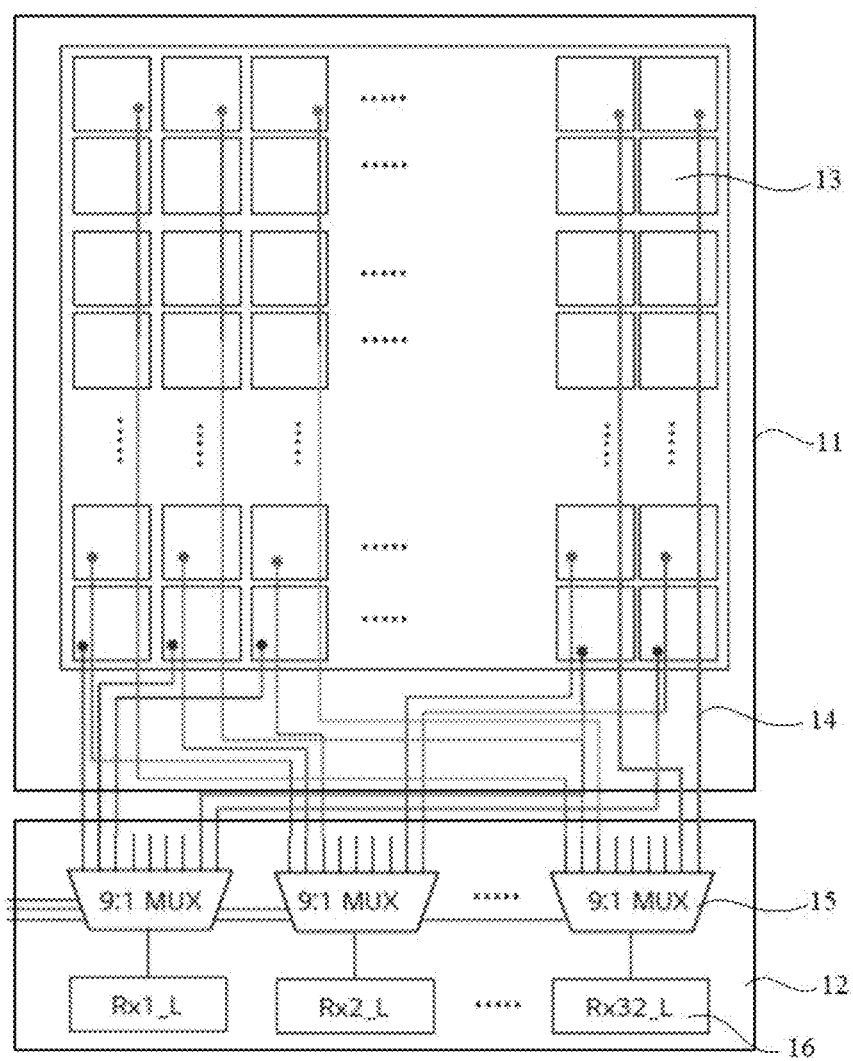
FIG. 3 is a diagram illustrating touch electrode arrangement and driving circuit construction of a conventional touch panel LCD device.
Figure 4A:
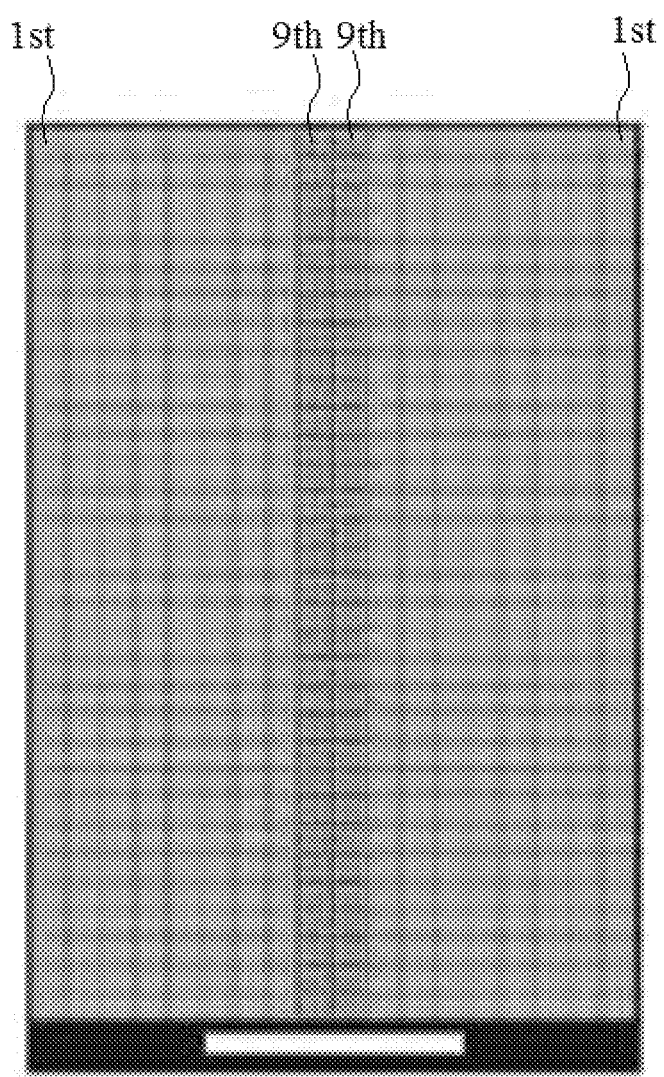
FIGS. 4A to 4C are a diagram for explaining signals applied to touch electrodes during a touch sensing period of the conventional touch panel LCD device.
Figure 4B:
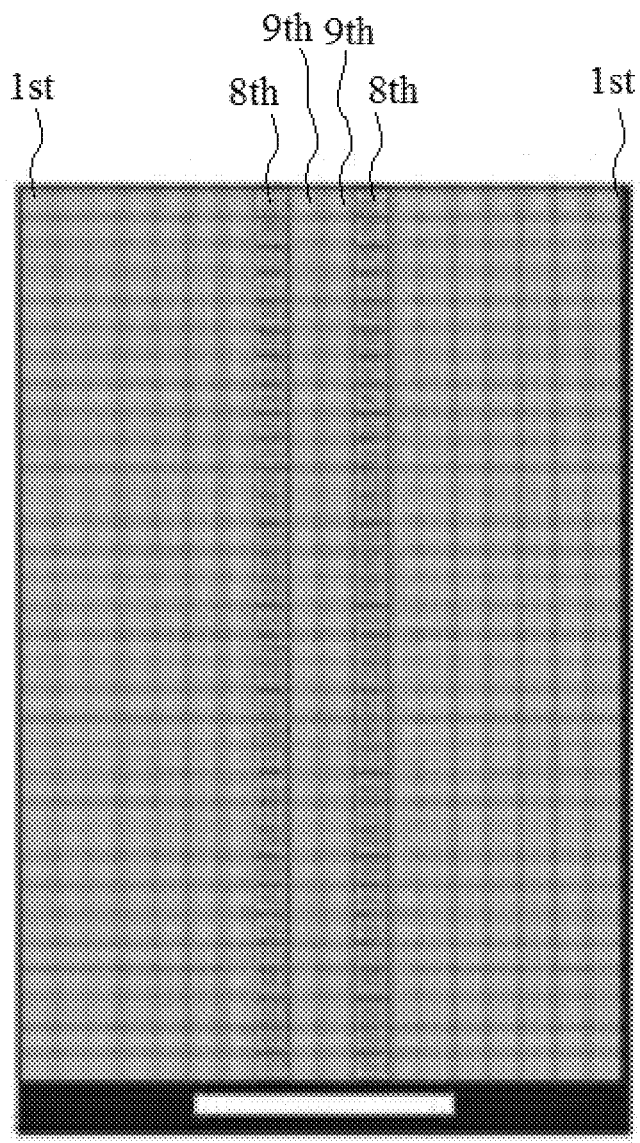
Figure 4C:
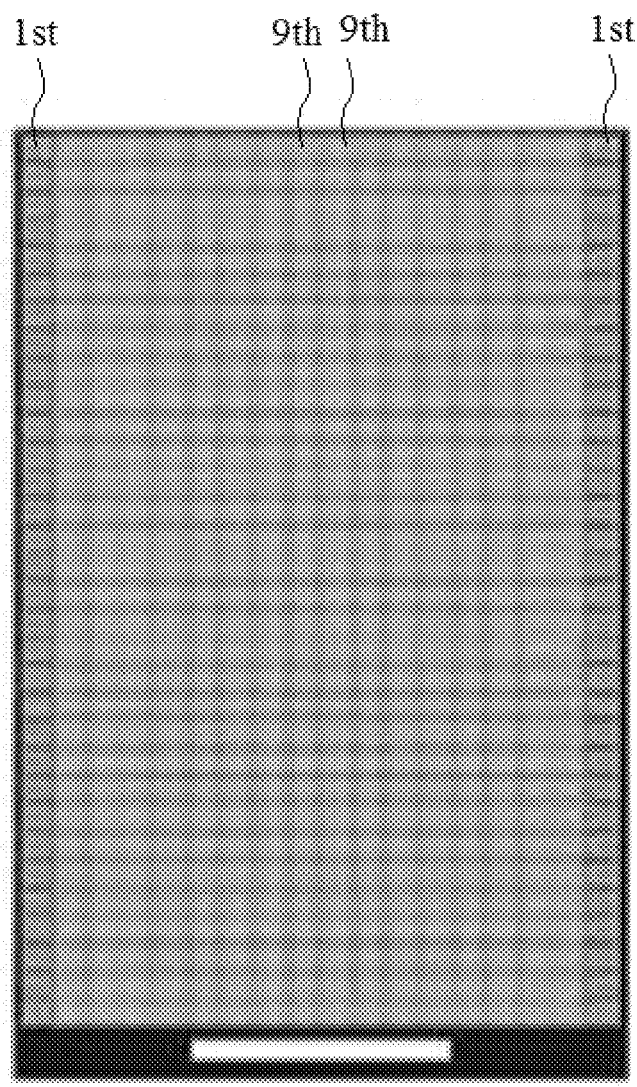
Figure 5A:
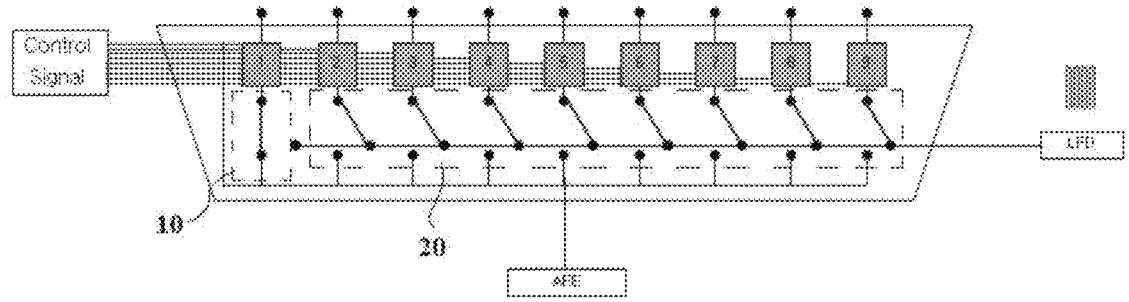
FIGS. 5A and 5B are diagrams illustrating a detailed construction of a multiplexer illustrated in FIG. 3.
Figure 5B:
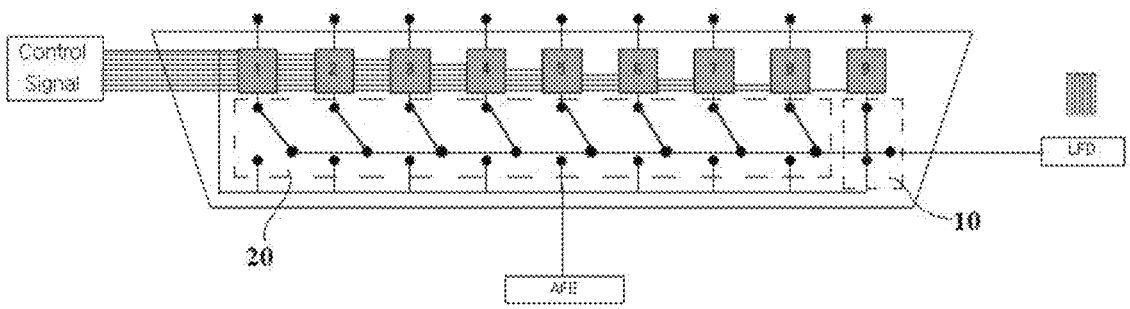

As can be seen from a connection relationship between the touch electrodes and the multiplexers in FIG. 3, each multiplexer includes 9 channels. To drive a total of 576 touch electrodes, each of the first and second sets of multiplexers includes 32 multiplexers.

To easily explain a driving method, channel numbers of the first set of 32 multiplexers and channel numbers of the second set of 32 multiplexers are symmetrically denoted in FIG. 6.

That is, channel numbers 9 of the first set of 32 multiplexers and channel numbers 9 of the second set of 32 multiplexers, based on the center of the touch electrodes, are adjacently arranged.

In other words, channel numbers of each of the first set of 32 multiplexers increase from the left to the center and channel numbers of each of the second set of 32 multiplexers decrease from the center to the right.

Accordingly, when the touch electrodes 1 to 576 are arranged as illustrated in FIG. 6, each multiplexer drives 9 touch electrodes in a horizontal direction.

For example, 9 channels of the first multiplexer of the first set drive the touch electrodes 1, 33, 65, 97, 129, 161, 193, 225, and 257. 9 channels of the first multiplexer of the second set drive touch electrodes 289, 321, 353, 385, 417, 449, 481, 513, and 545.

In this way, 9 channels of the 32nd multiplexer of the first set drive the touch electrodes 32, 64, 96, 128, 160, 192, 224, 256, and 288. 9 channels of the 32nd multiplexer of the second set drive the touch electrodes 320, 352, 384, 416, 448, 480, 512, 544, and 576.

In other words, channel numbers 1 of all multiplexers of the first set sequentially drive the touch electrodes 1 to 32, channel numbers 2 of all multiplexers of the first set sequentially drive the touch electrodes 33 to 64, channel numbers 3 of all multiplexers of the first set sequentially drive the touch electrodes 65 to 96, channel numbers 4 of all multiplexers of the first set sequentially drive the touch electrodes 97 to 128, channel numbers 5 of all multiplexers of the first set sequentially drive the touch electrodes 129 to 160, channel numbers 6 of all multiplexers of the first set sequentially drive the touch electrodes 161 to 192, channel numbers 7 of all multiplexers of the first set sequentially drive the touch electrodes 193 to 224, channel numbers 8 of all multiplexers of the first set sequentially drive the touch electrodes 225 to 256, and channel numbers 9 of all multiplexers of the first set sequentially drive the touch electrodes 257 to 288.

In addition, channel numbers 9 of all multiplexers of the second set sequentially drive the touch electrodes 289 to 320, channel numbers 8 of all multiplexers of the second set sequentially drive the touch electrodes 321 to 352, channel numbers 7 of all multiplexers of the second set sequentially drive the touch electrodes 353 to 384, channel numbers 6 of all multiplexers of the second set sequentially drive the touch electrodes 385 to 416, channel numbers 5 of all multiplexers of the second set sequentially drive the touch electrodes 417 to 448, channel numbers 4 of all multiplexers of the second set sequentially drive the touch electrodes 449 to 480, channel numbers 3 of all multiplexers of the second set sequentially drive the touch electrodes 481 to 512, channel numbers 2 of all multiplexers of the second set sequentially drive the touch electrodes 513 to 544, and the channel numbers 1 of all multiplexers of the second set sequentially drive the touch electrodes 545 to 576.

Each multiplexer includes, as illustrated in FIGS. 7A and 7B, 9 output channels 1 to 9, a first switching block 10 for outputting a sensing signal from a sensing unit (analog front end (AFE)) 16 to one of the 9 output channels 1 to 9, a second switching block 20 for outputting an LFD signal from an LFD signal output unit 17 to channel(s) (depending on specific configuration, for example one or two channels and so on) adjacent to the channel to which the sensing signal is output among the 9 output channels 1 to 9, and a third switching block 30 for outputting a ground signal and a floating signal to the other output channels except for the channels to which the sensing signal or the LFD signal are output among the 9 output channels 1 to 9. Herein, the first to third switching blocks 10, 20, and 30 are controlled by a control signal.

Referring to FIG. 7A, the sensing signal from the sensing unit 16 is applied to the channel number 1, the LFD signal from the LFD signal output unit 17 is applied to the channel number 2, and the ground or floating signal is applied to the other channel numbers 3 to 9. Referring to FIG. 7B, the sensing signal from the sensing unit 16 is applied to the channel number 9, the LFD signal from the LFD signal output unit 17 is applied to the channel number 8, and the ground or floating signal is applied to the other channel numbers 1 to 7. Although FIGS. 7A-7B only show the cases in which the LFD signal from the LFD signal output unit 17 is applied to one channel adjacent to the channel to which the sensing signal is output, those skilled in the art would understand that, depending on specific configuration, the LFD signal from the LFD signal output unit 17 can also be output to two channels adjacent to the channel to which the sensing signal is output among the nine output channels 1 to 9. For example, the sensing signal from the sensing unit 16 is applied to channel number 2, the LFD signal from the LFD signal output unit 17 is applied to channel numbers 1 and 3, and the ground signal or floating signal is applied to the other channel numbers 4 to 9.

Herein, the sensing signal and the LFD signal have the same waveform.

The number of touch electrodes, the number of multiplexers, and the number of channels of each multiplexer are not limited to the numbers illustrated in FIGS. 6 and 7a and 7b, and may be various changed according to the size and resolution of the display panel.

A driving method of the touch panel LCD device constructed as described above according to the present disclosure is as follows.

Sensing of the touch electrodes is performed by simultaneously sensing touch electrodes in a vertical direction. For example, the touch sensing signal is output to the channel numbers 9 of all multiplexers (64 multiplexers) of the first and second sets so that the touch electrodes 257 to 320 of two vertical lines of the center part are touch-sensed. Next, the touch sensing signal is output to the channel numbers 8 of all multiplexers (64 multiplexers) of the first and second sets so that the touch electrodes 225 to 256 and 321 to 352 of the next two vertical lines are touch-sensed. This process is repeated so that the touch sensing signal is output to the channel numbers 1 of all multiplexers (64 multiplexers) of the first and second sets. As a result, the touch electrodes 1 to 32 of the leftmost vertical line and the touch electrodes 545 to 576 of the rightmost vertical line are touch-sensed.

Herein, a sensing order of the touch electrodes may be variously changed.

As described above, when the touch electrodes are sensed in the direction of an edge part from the center part, the LFD signal is applied to the touch electrodes of vertical lines adjacent to the touch electrodes for sensing touch and the other touch electrodes are grounded or floated. For example, in the case of the specific configuration as shown in FIGS. 7A and 7B, the LFD signal is applied to touch electrodes of the vertical lines adjacent in both left and right directions to the touch electrodes for sensing touch, and other touch electrodes are grounded or floated.

Figure 8A:
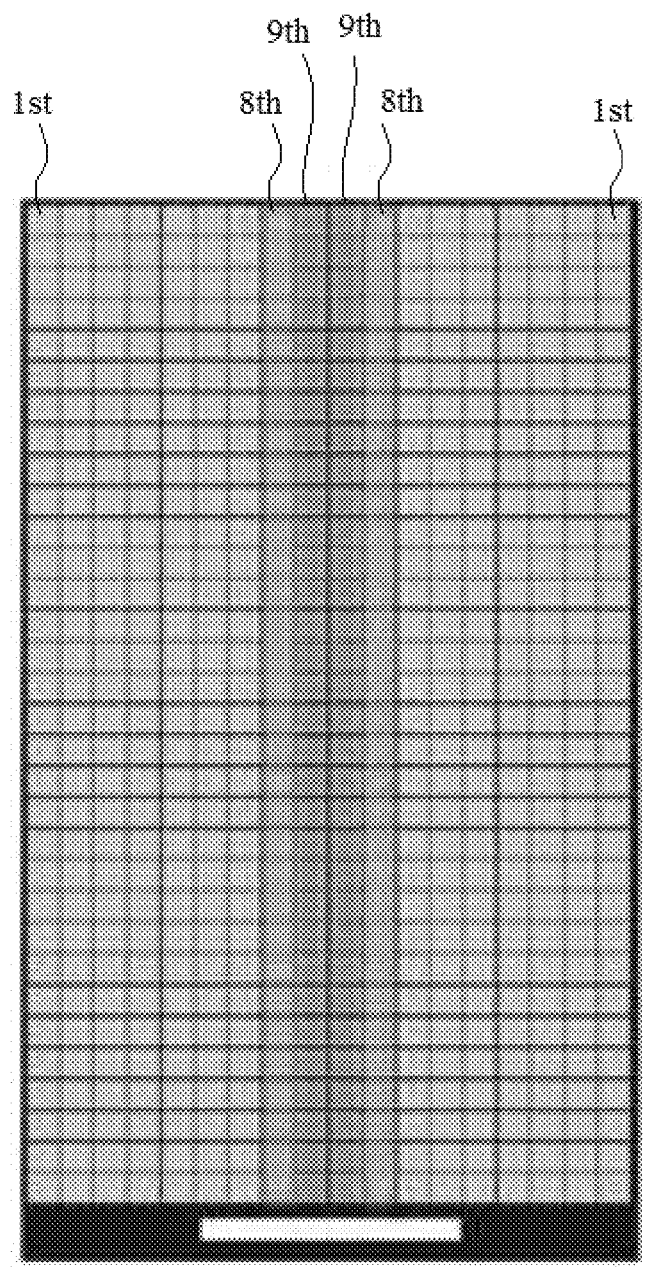
FIGS. 8A to 8C are diagrams for explaining signals applied to touch electrodes of a touch panel LCD device during a touch sensing period according to a first embodiment of the present disclosure.
Figure 8B:
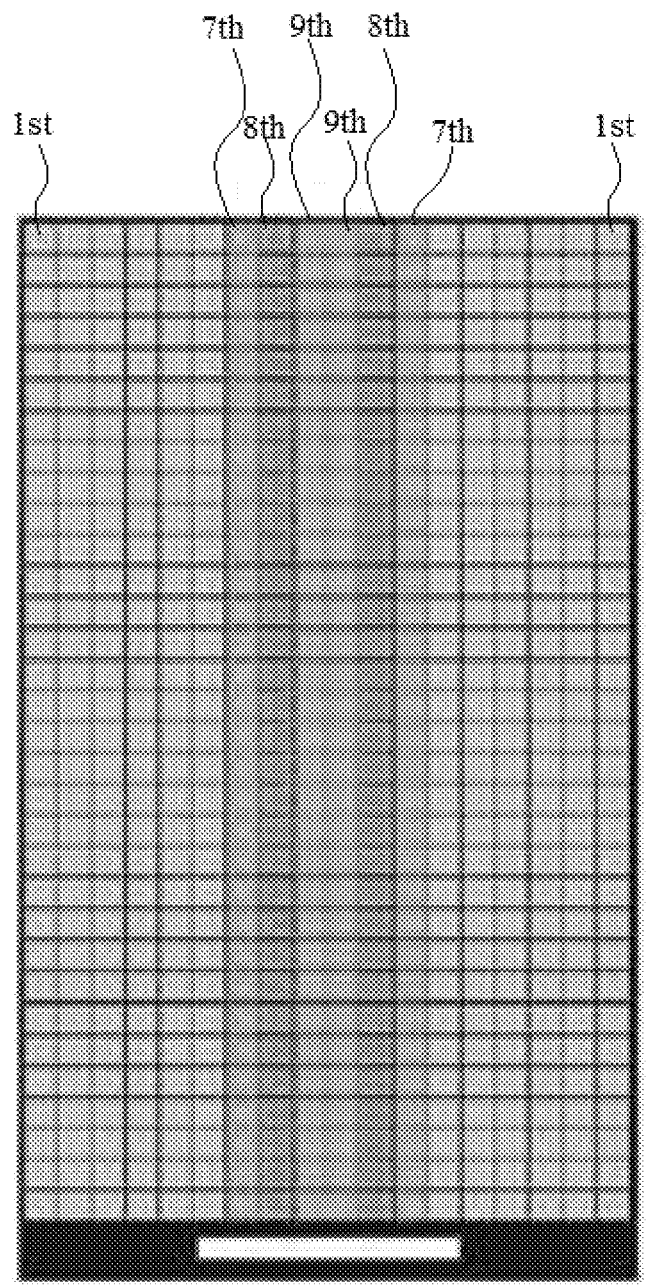
Figure 8C:
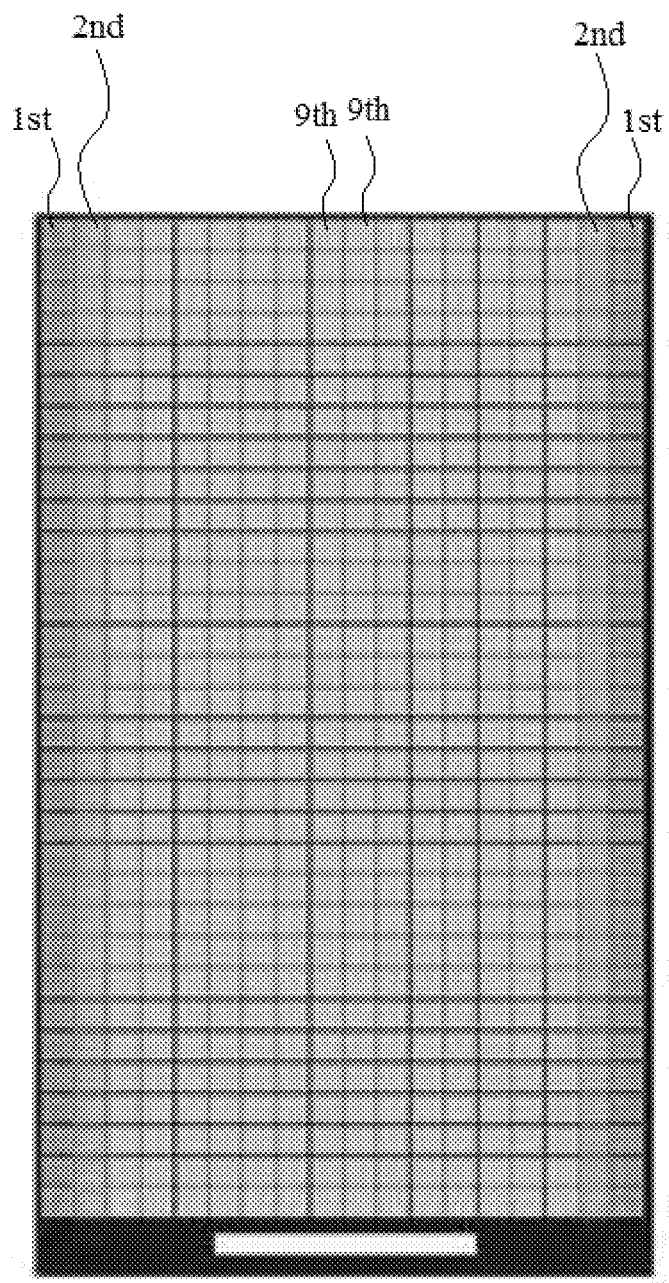

FIGS. 8A to 8C are diagrams for explaining signals applied to touch electrodes of a touch panel LCD device during a touch sensing period according to a first embodiment of the present disclosure.

In FIG. 8A to 8C, yellow colored parts denote electrodes for sensing touch, blue colored parts denote touch electrodes to which an LFD signal is applied, and gray colored parts denote touch electrodes which are grounded or floated.

That is, as shown in FIG. 8A, when touch electrodes 257 to 320 of 9th vertical lines in the left and right sides of a center part perform touch sensing, the LFD signal is applied to touch electrodes 225 to 256 and 321 to 352 of two 8th vertical lines adjacent in both left and right directions to the touch electrodes 257 to 320 to which a touch sensing signal is applied, and a ground signal GND or a floating signal is applied to the other touch electrodes 1 to 224 and 321 to 576 of both left and right 1st to 7th vertical lines.

That is, all multiplexers of first and second sets output the sensing signal to channel numbers 9, output the LFD signal to channel numbers 8, and output the ground or floating signal to channel numbers 1 to 7.

In other words, in FIG. 7A or 7B, the first switching block 10 is switched to connect the sensing unit 16 to the channel numbers 9, the second switching block 20 is switched to connect the LFD signal output unit 17 to the channel numbers 8, and the third switching block 30 is switched to connect a ground terminal GND 18 or a floating terminal to the channel numbers 1 to 7.

In addition, as shown in FIG. 8B, when the touch electrodes 225 to 256 and 321 to 352 of two left and right 8th vertical lines perform touch sensing, the LFD signal is applied to the touch electrodes 257 to 320 of two center 9th vertical lines and the touch electrodes 193 to 224 and 353 to 384 of two left and right 7th vertical lines, which are adjacent in both left and right directions to the two left and right 8th vertical lines, and the ground signal GND or the floating signal is applied to the other touch electrodes 1 to 192 and 385 to 576 of both left and right 1st to 6th vertical lines.

That is, all multiplexers of the first and second sets output the sensing signal to the channel numbers 8, output the LFD signal to the channel numbers 7 and 9, and output the ground or floating signal to the other channel numbers 1 to 6.

In other words, in FIG. 7A or 7B, the first switching block 10 is switched to connect the sensing unit 16 to the channel numbers 8, the second switching block 20 is switched to connect the LFD signal output unit 17 to the channel numbers 7 and 9, and the third switching block 30 is switched to connect the ground terminal GND 18 or the floating terminal to the channel numbers 1 to 6.

In addition, when the touch electrodes 193 to 224 and 353 to 384 of two left and right 7th vertical lines perform touch sensing, the LFD signal is applied to the touch electrodes 225 to 256 and 321 to 352 of two left and right 8th vertical lines and the touch electrodes 161 to 192 and 385 to 416 of two left and right 6th vertical lines, which are adjacent in both left and right directions to the two left and right 7th vertical lines, and the ground signal GND or the floating signal is applied to the other touch electrodes 1 to 160, 257 to 320, and 417 to 576 of two left and right $1^{st}$ to $5^{th}$ and $9^{th}$ vertical lines.

That is, all multiplexers of the first and second sets output the sensing signal to the channel numbers 7, output the LFD signal to the channel numbers 6 and 8, and output the ground or floating signal to the other channel numbers 1 to 5, and 9.

This process is repeated. As shown in FIG. 8C, if the touch electrodes 1 to 32 and 545 to 576 of the two left and right first vertical lines are touch-sensed, the LFD signal is applied to the touch electrodes 33 to 64 and 513 to 544 of the two left and right second vertical lines, which are adjacent the touch electrodes 1 to 32 and 545 to 576 of the two left and right first vertical lines, and the ground signal GND or floating signal is applied to the other touch electrodes 65 to 512.

That is, all multiplexers of the first and second sets output the sensing signal to the channel numbers 1, output the LFD signal to the channel numbers 2, and output the ground or floating signal to the other channel numbers 3 to 9.

In this way, since the LFD signal is applied to touch electrodes of vertical lines adjacent to one vertical line for sensing touch (for example, in the embodiments shown in FIGS. 8A-8C, adjacent in both left and right directions to one vertical line for sensing touch) and the other touch electrodes are ground or floated, power consumption is reduced and periodic and audible noise are reduced.

Meanwhile, sensing of the touch electrodes may be performed by simultaneously sensing touch electrodes in a horizontal direction. For example, two multiplexers out of 32 multiplexers of the first set and two multiplexers out of 32 multiplexers of the second set may output the touch sensing signal to all channels thereof and multiplexers adjacent to the multiplexers for outputting the touch sensing signal may output the LFD signal to all channels thereof, and the other multiplexers may output the ground or floating signal to all channels thereof.

Figure 9A:
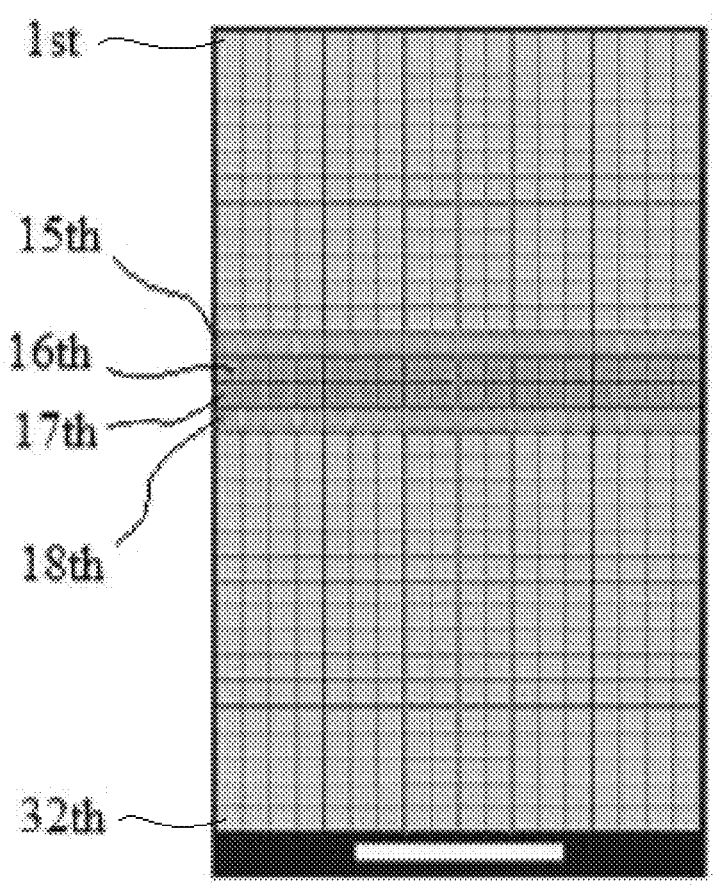
FIG. 9A to 9C are diagrams for explaining signals applied to touch electrodes of a touch panel LCD device during a touch sensing period according to a second embodiment of the present disclosure.
Figure 9B:
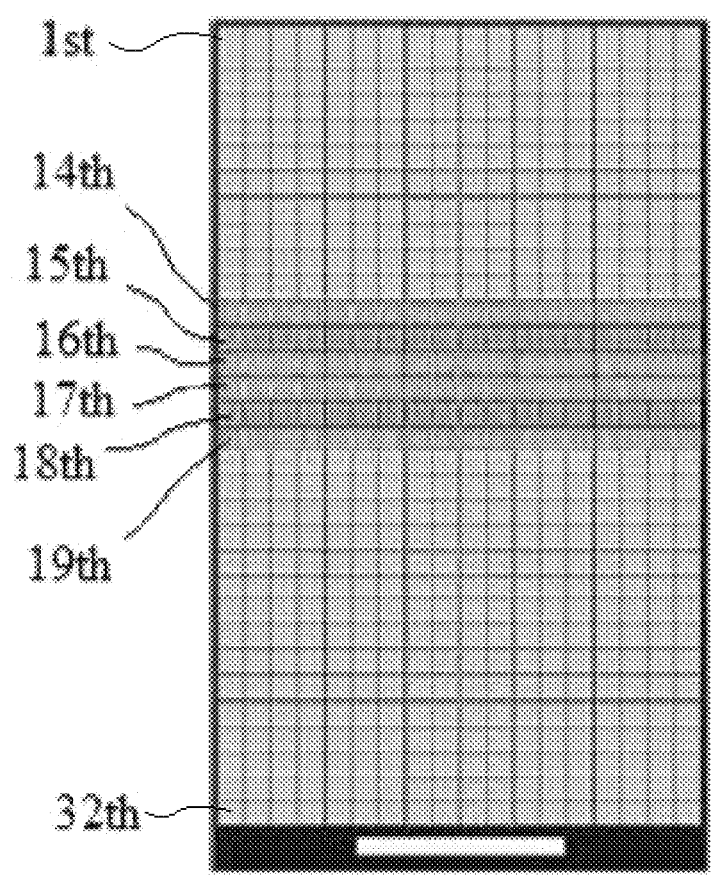
Figure 9C:
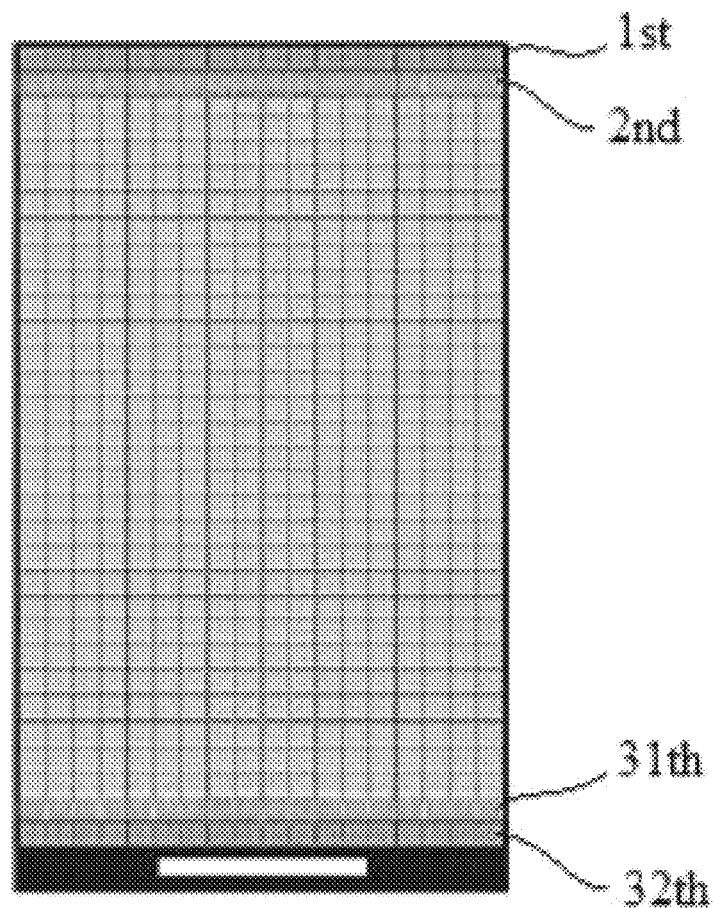

FIGS. 9A to 9C are diagrams for explaining signals applied to touch electrodes of a touch panel LCD device during a touch sensing period according to a second embodiment of the present disclosure.

As illustrated in FIG. 9A, the 16th and 17th multiplexers among multiplexers of a first set and the 16th and 17th multiplexers among multiplexers of a second set output a touch sensing signal to all channels thereof, the 15th and 18th multiplexers adjacent in upper and lower directions to the 16th and 17th multiplexers output the LFD signal to all channels thereof, and the other multiplexers (i.e., the first to 14th multiplexers and 19th to 32nd multiplexers) output a ground or floating signal to all channels thereof.

That is, the first switching block 10 is switched to connect the sensing unit 16 to all channels of the 16th and 17th multiplexers of the first and second sets, the second switching block 20 is switched to connect the LFD signal output unit 17 to all channels of the 15th and 18th multiplexers of the first and second sets, and the third switching block 30 is switched to connect the ground terminal GND 18 or the floating terminal to all channels of the other multiplexers (i.e., the first to 14th multiplexers and the 19th to 32nd multiplexers).

In addition, as illustrated in FIG. 9B, the 15th and 18th multiplexers among the multiplexers of the first set and the 15th and 18th multiplexer among the multiplexers of the second set output the touch sensing signal to all channels thereof, the 14th, 16th, 17th, and 19th multiplexers adjacent in upper and lower directions to the 15th and 18th multiplexers output the LFD signal to all channels thereof, and the other multiplexers (i.e., the first to 13th multiplexers and 20th to 32nd multiplexers) output the ground or floating signal to all channels thereof.

That is, the first switching block 10 is switched to connect the sensing unit 16 to all channels of the 15th and 18th multiplexers of the first and second sets, the second switching block 20 is switched to connect the LFD signal output unit 17 to all channels of the 14th, 16th, 17th, and 19th multiplexers of the first and second sets, and the third switching block 30 is switched to connect the ground terminal GND 18 or the floating terminal to all channels of the other multiplexers (i.e., the first to 13th multiplexers and the 20th to 32nd multiplexers).

By performing the above process, as illustrated in FIG. 9C, the first and 32nd multiplexers among the multiplexers of the first set and the first and 32nd multiplexers among the multiplexers of the second set output the touch sensing signal to all channels thereof, the second and 31st multiplexers which are adjacent in upper and lower directions to the first and 32nd multiplexers output the LFD signal to all channels thereof, and the other multiplexers (i.e., the third to 30th multiplexers) output the ground or floating signal to all channels thereof.

That is, the first switching block 10 is switched to connect the sensing unit 16 to all channels of the first and 32nd multiplexers of the first and second sets, the second switching block 20 is switched to connect the LFD signal output unit 17 to all channels of the second and 31st multiplexers of the first and second sets, and the third switching block 30 is switched to connect the ground terminal 18 and the floating terminal to all channels of the other multiplexers (i.e., the third to 30th multiplexers).

In this way, since the LFD signal is applied to touch electrodes of horizontal lines adjacent to one horizontal line for sensing touch (for example, in the embodiments shown in FIGS. 9A-9C, adjacent in both upper and lower directions to one horizontal line for sensing touch) and the other touch electrodes are ground or floated, power consumption is reduced and periodic and audible noise is reduced.

Figure 10A:
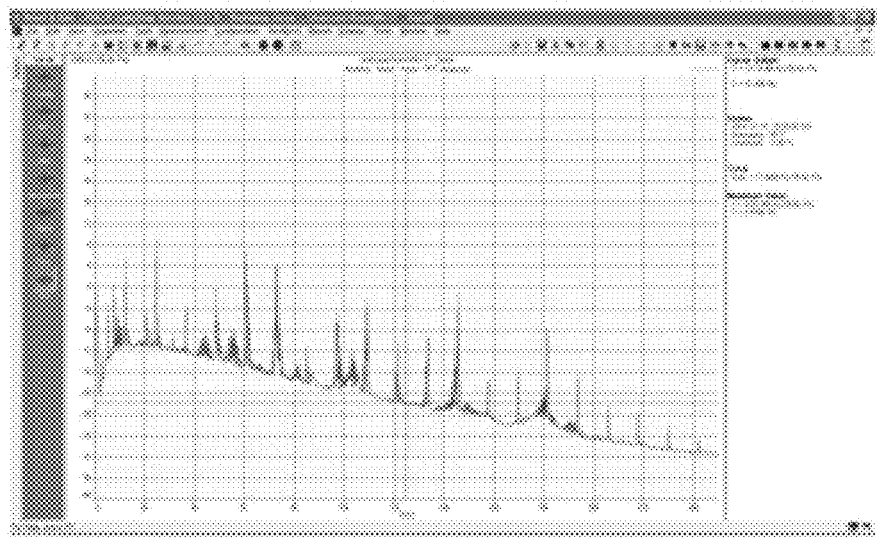
FIGS. 10A and 10B are graphs illustrating comparison of periodic noise of touch panel LCD devices according to an embodiment of the prior art and the present disclosure, respectively.
Figure 10B:
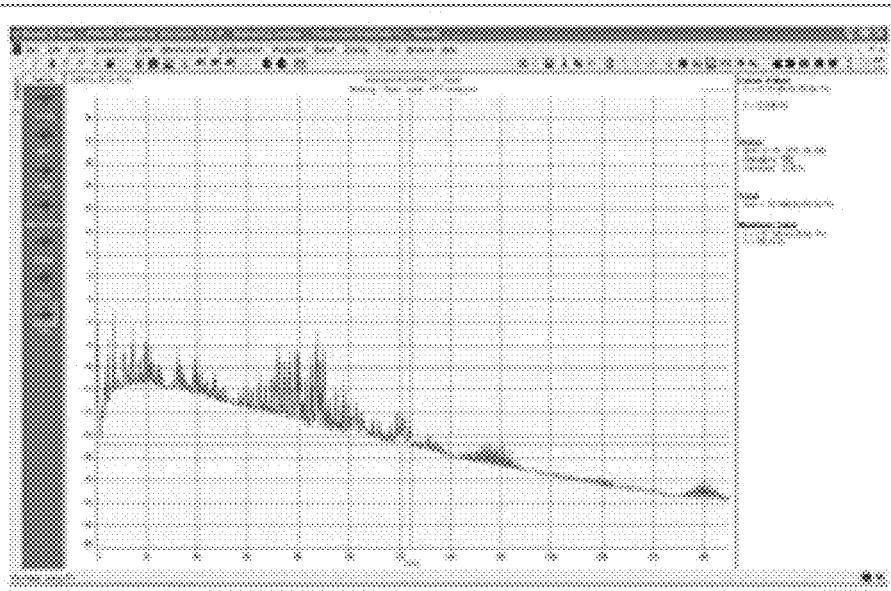

FIGS. 10A and 10B are graphs illustrating comparison of periodic noise of touch panel LCD devices according to an embodiment of the prior art and the present disclosure, respectively.

FIG. 10A is a graph when a touch panel LCD device is driven by a conventional long-H scheme, and FIG. 10B is a graph when a touch panel LCD device is driven by a long-H scheme according to an embodiment of the present disclosure.

According to the conventional scheme, noise occurs at a cycle of 1.2 kHz, whereas, according to the present disclosure, periodic noise does not occur.

The touch panel LCD device having the above-described characteristics according to the present disclosure and a method of driving the same have the following effects.

Power consumption is reduced and periodic and audible noise is reduced by applying the LFD signal to touch electrodes of vertical or horizontal lines, for example adjacent in left and right directions or upper and lower directions to touch electrodes of one vertical line or one horizontal line for sensing touch and by grounding or floating the other touch electrodes. Moreover, those skilled in the art would understand that, depending on specific configurations, the LFD signal can be applied to touch electrodes that are adjacent in other directions to touch electrodes for sensing touch.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touch panel liquid crystal display (LCD) device, comprising:
   a plurality of touch electrodes arranged on a panel in a matrix form; and
   a plurality of multiplexers configured to drive the plurality of touch electrodes,
   wherein each of the multiplexers includes
   a plurality of output channels,
   a first switching block configured to output a touch sensing signal to a first output channel of the plurality of output channels,
   a second switching block configured to output a load free driving (LFD) signal to one or more second output channels adjacent to the first output channel, and
   a third switching block configured to output a ground signal or a floating signal to third output channels except for the first and the one or more second output channels among the plurality of output channels.

2. A touch panel liquid crystal display (LCD) device, comprising:
   a plurality of touch electrodes arranged on a panel in a matrix form; and
   a plurality of multiplexers configured to drive the plurality of touch electrodes,
   wherein the plurality of multiplexers include
   at least one first multiplexer configured to output a touch sensing signal through all output channels thereof,
   second multiplexers adjacent to the at least one first multiplexer and configured to output a load free driving (LFD) signal through all output channels thereof, and
   third multiplexers configured to output a ground signal or a floating signal through all output channels thereof.

3. A method of driving a touch panel liquid crystal display (LCD) device including a plurality of touch electrodes arranged on a panel in a matrix form and a plurality of multiplexers configured to drive the plurality of touch electrodes, the method comprising:
   applying a touch sensing signal to a plurality of touch electrodes of at least one first vertical line;
   applying a load free driving (LFD) signal to a plurality of touch electrodes of second vertical lines adjacent to the at least one first vertical line; and
   grounding or floating another plurality of touch electrodes.

4. The method of claim 3, wherein each multiplexer includes n channels, outputs the touch sensing signal to a k-th channel, outputs an LFD signal to (k−1)-th and (k+1)-th channels, and grounds or floats other channels, where n and k are natural numbers, and k is less than or equal to n.

5. A method of driving a touch panel liquid crystal display (LCD) device including a plurality of touch electrodes arranged on a panel in a matrix form and a plurality of multiplexers configured to drive the plurality of multiplexers, the method comprising:
   applying a touch sensing signal to a plurality of touch electrodes of at least one first horizontal line;
   applying a load free driving (LFD) signal to a plurality of touch electrodes of second horizontal lines adjacent to the at least one first horizontal line; and
   grounding or floating another plurality of touch electrodes.

6. The method of claim 5, wherein a k-th multiplexer outputs a touch sensing signal through all channels thereof, (k−1)-th and (k+1)-th multiplexers output an LFD signal through all channels thereof, and other multiplexers ground or float all channels thereof.

* * * * *